Nov. 23, 1937.   R. M. NARDONE   2,099,768
DRIVING MECHANISM
Original Filed May 8, 1931

INVENTOR
Romeo M. Nardone.
BY
F. B. Smith
ATTORNEY

Patented Nov. 23, 1937

2,099,768

UNITED STATES PATENT OFFICE 2,099,768

DRIVING MECHANISM

Romeo M. Nardone, East Orange, N. J., assignor to Eclipse Aviation Corporation, East Orange, N. J., a corporation of New Jersey Original application May 8, 1931, Serial No. 536,031. Divided and this application August 31, 1936, Serial No. 98,799

1 Claim. (Cl. 192—82)

This invention relates to driving mechanism and more particularly to driving mechanism of the character involving normally disengaged coupling or clutch elements, movable into engagement when torque is to be transmitted—as, for example, from an engine starting motor to an engine crankshaft.

An object of the present invention is to provide novel means for operatively connecting a starter of the foregoing type to the engine, whereby the energy of the starter may be rendered effective to start the engine.

A further object is to provide a clutch or coupling mechanism and operating means therefor adapted for the foregoing as well as other uses, and embodying a novel construction possessing practical merit and insuring efficiency and reliability in operation.

These and other objects will become apparent upon inspection of the following specification and the accompanying drawing, wherein is illustrated the preferred embodiment of the invention. It is to be expressly understood, however, that the drawing is intended merely to serve as an illustration of one mode of embodying the invention in a practical form and is not designed as a definition of the limits of the invention, reference being had for this purpose to the appended claim.

In the drawing:—

Figures 1, 2, 3:
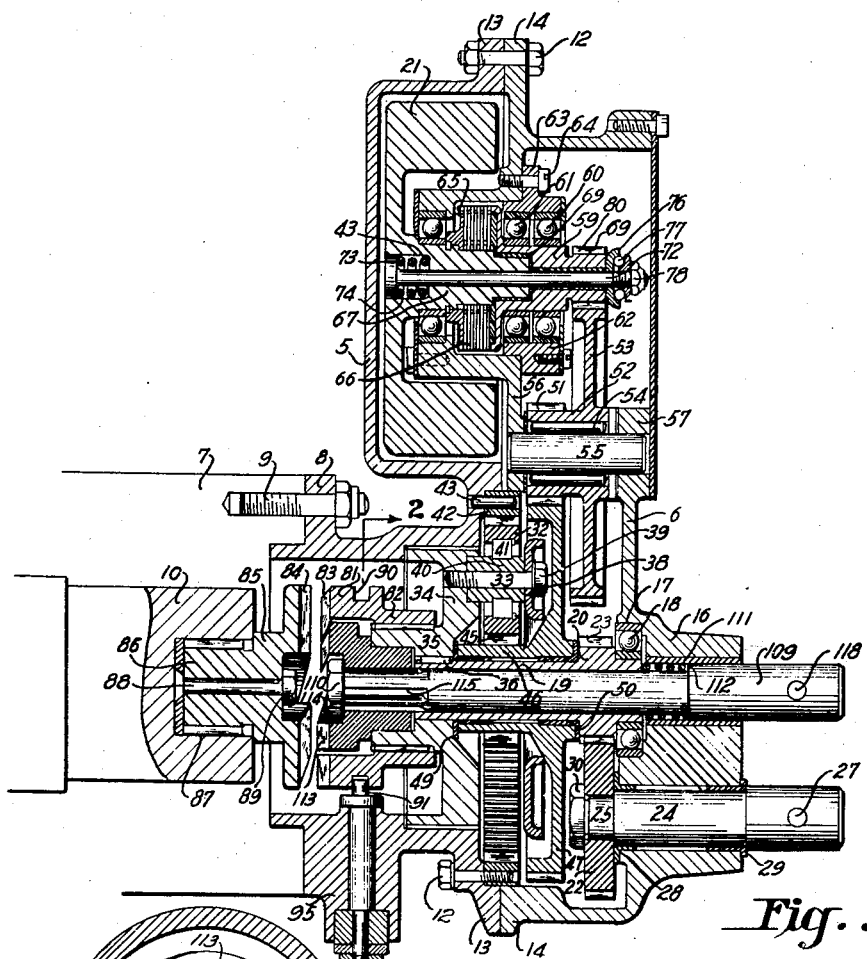
Fig. 1 is a central vertical section of a device embodying the invention.
Fig. 2 is a transverse sectional view taken along the line 2—2 of Fig. 1.
Fig. 3 is a transverse sectional view taken along the line 3—3 of Fig. 2.

Referring particularly to Fig. 1, the invention is therein shown embodied in a housing comprising two sections 5 and 6, the former being adapted to be secured in an extension 7 of the crankcase of an internal combustion engine, the casing 5 being provided for this purpose with a flange 8 having suitable openings adapted to receive bolts 9 for mounting the starter in operative position with respect to the crankshaft 10, or other rotatable member of the engine operatively connected to such crankshaft.

Suitable means are provided for attaching the section 5 to the section 6, such means comprising, as shown, a plurality of bolts 12 adapted to secure together the flanges 13 and 14 provided on the sections 5 and 6 respectively. The section 6 is further provided with an outwardly extending boss or hub 16 having a recess 17 adapted to receive a ball bearing member 18 serving to rotatably support the hollow shaft 19, the latter being held against longitudinal movement relative to the boss 16 by suitable means to be described.

Mounted on the shaft 19 for rotary movement therewith is a member drivably connected, through suitable speed multiplying mechanism to be described, to a flywheel 21 of suitable mass and weight to constitute an inertia member in which energy may be stored for subsequent transmission to the engine member 10. Novel means are provided for rotating the shaft 19 whereby energy may be stored in the flywheel 21. As shown, such novel means comprises an enlarged portion 20 of shaft 19 on which are cut teeth 23 adapted to mesh with the teeth of a spur gear 22 affixed to the reduced end portion 25 of a shaft 24 extending through the boss 16 in parallelism with the shaft 19 and being provided near its outer end with a pin 27 or other suitable means adapted to be engaged by a hand crank or other manual rotating device, a pair of spacing bushings 28 and 29 being provided upon the shaft 24 having flanges engageable with the inner and outer faces of the boss 16 to maintain the shaft 24 in proper position, a nut 30 being provided on the threaded end of shaft 24 to maintain the gear 22 in place.

The means employed for drivably connecting the hand cranking means just described to the flywheel 21, preferably comprises a system of gearing including a planetary gear assembly associated with the shaft 19 and operable to transmit the rotary movement of said shaft to a second set of gears which are in turn drivably associated with the flywheel. The planetary gearing preferably comprises a plurality of planet gears 32, each of which is rotatably mounted on a bolt 33 threadedly secured to a recessed plate or driving barrel 34 for rotary movement therewith, the barrel 34 having a centrally disposed hub 35, the inner circumferential surface of which is drivably connected to the end of shaft 19, suitable key means 36 being provided for this purpose. The bolts 33 are in turn adapted to be held in proper spaced relation to the barrel 34 by the provision of suitable collars 38 interposed between the bolt heads 39 and the spacer sleeves 40, the latter being adapted to rotatably receive the bearing members 41 on which the gears 32 are mounted.

The planetary assembly further comprises the provision of an internally toothed annular gear 42 which is preferably secured to the casing 5 by means of bolts 12, dowel pins 43 being also provided to aid in properly positioning the gear 42. The annulus gear 42 therefore constitutes a reaction gear about which the planets 32 travel while rotating around a centrally disposed sun gear 45 with which they mesh. The sun gear 45 is shown in Fig. 1 as formed integral with the elongated hub 46 of a gear 47 which surrounds the shaft 19, being held in proper axial relation thereto by the provision of suitable flanged spacers 49 and 50. The gear 47 is in turn adapted to mesh with a pinion 51 preferably formed integral with a hub 52 of a gear 53 which is rotatably supported with the assistance of roller bearings 54 on the stub shaft 55, the ends of which are journaled respectively in the dividing wall 56 and the boss 57 located at the upper end of the casing 6.

The means for drivably connecting the gear 53 with the flywheel 21 are preferably of a yielding character and, as shown, comprises a friction clutch mechanism one member 59 of which is rotatably supported with the assistance of ball bearings 60 and 61 in an annular plate 62 having a flange 63 provided with apertures through which pass screws 64 adapted to threadedly engage correspondingly threaded openings in the dividing wall 56. The member 59 is flanged at its inner end as indicated at 65 with splines adapted to engage alternate members of an annular disc clutch assembly 66, the intermediate members of which are similarly splined at their inner circumferential edges to the hub 67 extending axially forward of the flywheel 21. A spacer sleeve 69 is preferably interposed between the hub 67 of the flywheel and the member 59 of the clutch assembly to permit relative rotation therebetween, the said spacer sleeve also extending forward to permit relative rotation of the member 59 and the centrally disposed shaft or rod 72 which, in cooperation with a spring 73 provided in the recess 74 of the flywheel, maintains the desired frictional pressure on the friction surfaces of the clutch assembly, suitable tension adjusting means being provided, as shown at 76, where such means takes the form of a collar surrounding the rod 72 and rotatable relatively thereto through the instrumentality of the ball bearing 77, a nut 78 being provided to maintain the collar 76 in adjusted position on the shaft 72. The outer end of the member 59 is preferably provided with a series of circumferentially disposed teeth 80 forming a pinion adapted to mesh with the teeth of gear 53.

From the foregoing it is apparent that manual operation of the shaft 24 will be effective through the gearing and clutch connections just described to rotate the flywheel 21 at a speed considerably in excess of that of which the shaft 24 can be rotated by hand. When the flywheel 21 has thus been accelerated sufficiently to accumulate therein the required amount of energy, the same may be delivered to the engine member 10 through a reverse driving operation accorded to the gear train above described, the member 34 of which is adapted to be drivably connected to the engine member 10 by the means now to be described.

The means employed for drivably connecting the barrel 34 with the engine member 10 preferably comprises the provision of an engine-engaging member 81 having a hub 82 provided with internal splines adapted to engage corresponding splines on the hub 35 of the barrel 34, the member 81 being provided at its opposite end with inclined teeth or jaws 83 adapted to engage corresponding teeth or jaws 84 provided on a member 85 having a splined hub 86 adapted to register with the splined socket 87 formed in the end of the engine member 10, a suitably countersunk rod 88 and nut 89 being provided to maintain the member 85 against axial movement with respect to the engine shaft 10.

The member 81 is further provided with a circumferential groove 90 adapted to receive a pin 91 riveted or otherwise suitably secured as indicated at 92 (Fig. 2) to a crank-arm 93 provided at the inner end of meshing shaft 94 which extends through the boss 95 formed on the casing member 5. The means for actuating the meshing pin 94, and for yieldably restraining it in either position to which it is moved, will next be described.

The means for actuating and restraining the meshing shaft 94 as illustrated in Figs. 2 and 3 preferably comprises the provision of a boss 96 extending at right angles from the central boss 95 as indicated in Fig. 2 and provided with a socket in which is disposed a compression spring 97 adapted to press upon the head of a locking pin or plunger 98 whose opposite end is shaped to engage one or the other of the notches 99 and 100 formed at proper angular positions on the periphery of the sleeve member 101 rigidly secured, as indicated at 102 to the meshing shaft 94. The outer end of the spring 97 is adapted to be seated on a threaded block 103 which is provided with a groove 104 for reception of suitable means for adjusting the stress in spring 97. Near the outer end of the shaft 94 is provided a crankarm having a suitable handle 107 by which the shaft 94 may be rotated against the pressure of the spring 97 to cause an axial movement of the jaw 81 into meshing engagement with the engine jaw 84, the notch 100 being so disposed with relation to the notch 99 that it registers with the end of the plunger 98 upon completion of the meshing movement and is thereafter held in such position by the force of spring 97 notwithstanding the release of the handle 107 by the operator.

In the event that it is desired to crank the engine by direct action rather than by the use of energy previously stored in the flywheel 21, such direct cranking is possible through the operation of the novel direct cranking and alternate meshing means herein disclosed. As shown in Fig. 1 such means comprises a second cranking shaft 109 preferably disposed in coaxial alignment with the engine member 10 and in parallelism with the first described cranking shaft 24. As shown shaft 109 passes centrally through the hollow shaft 19 and is provided at its inner end with a nut 110 adapted to retain in place a second meshing member 113, this function being performed by the nut 110 with the assistance of a compression spring 111, which abuts the end of shaft 19 and exerts a pressure on the shoulder 112 formed on shaft 109. As shown, such member is preferably similar in construction to the meshing member 81 and is provided with inclined teeth or jaws 114 similar to the jaws 83 and disposed in relation thereto, so as to be capable of meshing with the corresponding jaws 34 of the engine member 85. A suitable driving connection is provided between the inner end of the shaft 109 and the meshing member 113, such driving connection being shown in the form of splines 115 on shaft 109 adapted to engage corresponding splines on the interior cylindrical surface of the meshing member 113. A suitable pin 118 is provided near the outer end of the shaft 109 for the reception of the handcrank or other suitable meshing means which if desired may be an electric motor or other power device.

Having thus enumerated the parts entering into the embodiment of the invention illustrated in Figs. 1, 2 and 3, the operation thereof will now be briefly reviewed. In the event that it is desired to crank the engine through the use of energy stored in the flywheel 21, the latter may be energized by rotation of shaft 24, which rotation will be effective to store energy in the flywheel 21 through the intermediary of the speed changing mechanism above described. When sufficient energy has thus been accumulated in the inertia member 21, the operator may rotate the meshing shaft 94, by means of handle 107, from the position indicated in Fig. 3, through the required angle necessary to cause meshing engagement between the jaws 83 and 84. Thereupon the engine member 85 will be rotated in unison with the member 81 which has meanwhile been rotating with the member 34. During the cranking operation, the pressure of spring 97 is sufficient to maintain the plunger 98 in registry with the notch 100 and thereby hold the jaws 83 and 84 in meshing relation. As soon, however, as the engine starts under its own power, the resultant superior torque thereof will cause disengagement of the jaw 83 (due to the inclination of its surfaces) and corresponding oscillation of the meshing shaft 94 and sleeve 101 in the position indicated in Fig. 3, such return oscillation being effected against the pressure of spring 97, which is yieldable in response to the exertion of the superior force of the engine member 85.

If, on the other hand, direct cranking of the engine is desired, such direct cranking may be produced by engagement of suitable actuating means with the end of shaft 109, and by exertion thereon of axial pressure causing the inward movement of the jaw member 113 into meshing engagement with the engine member 85. Thereupon the engine may be started under its own power through continued rotation of the shaft 109. As soon as the engine starts under its own power, a disengagement of jaw member 113 results from the combined action of the inclined surface of the jaws and the previously compressed spring 11, the latter being normally effective to maintain the direct cranking means ineffective.

This application is a division of my co-pending application, Serial Number 536,031, filed May 8, 1931.

What is claimed is:—

In a rotation transmitting mechanism of the type embodying an axially movable rotatable clutch member having a peripheral groove, a rockshaft having its axis directed toward said clutch member and also having an extension engageable with said peripheral groove, a sleeve movable with said rockshaft, said sleeve having a pair of angularly spaced notches along its outer surface, and means engageable with said notches to yieldably oppose movement of said rockshaft and sleeve.

ROMEO M. NARDONE.